UNITED STATES PATENT OFFICE.

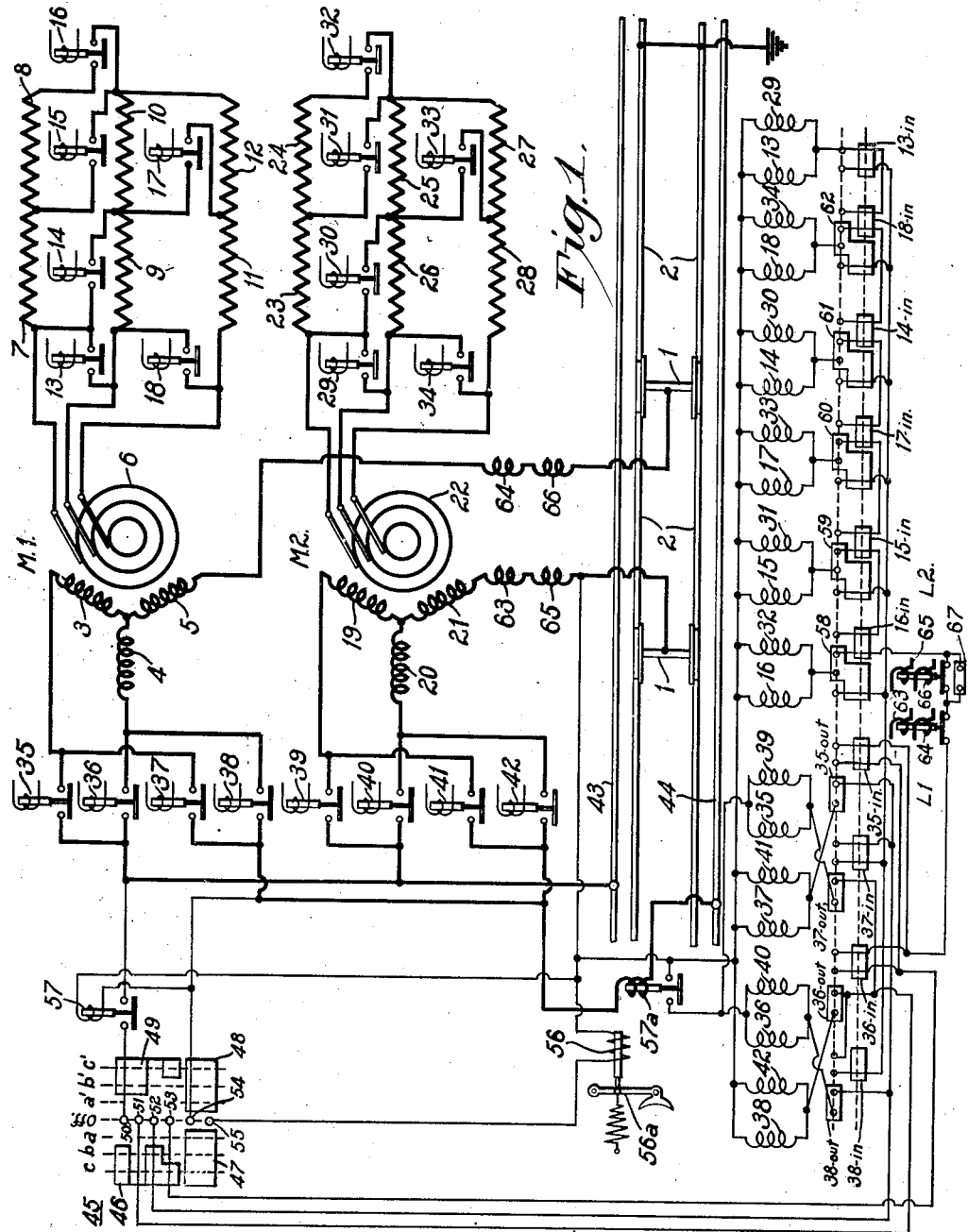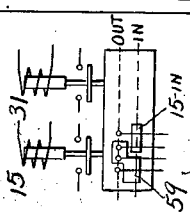

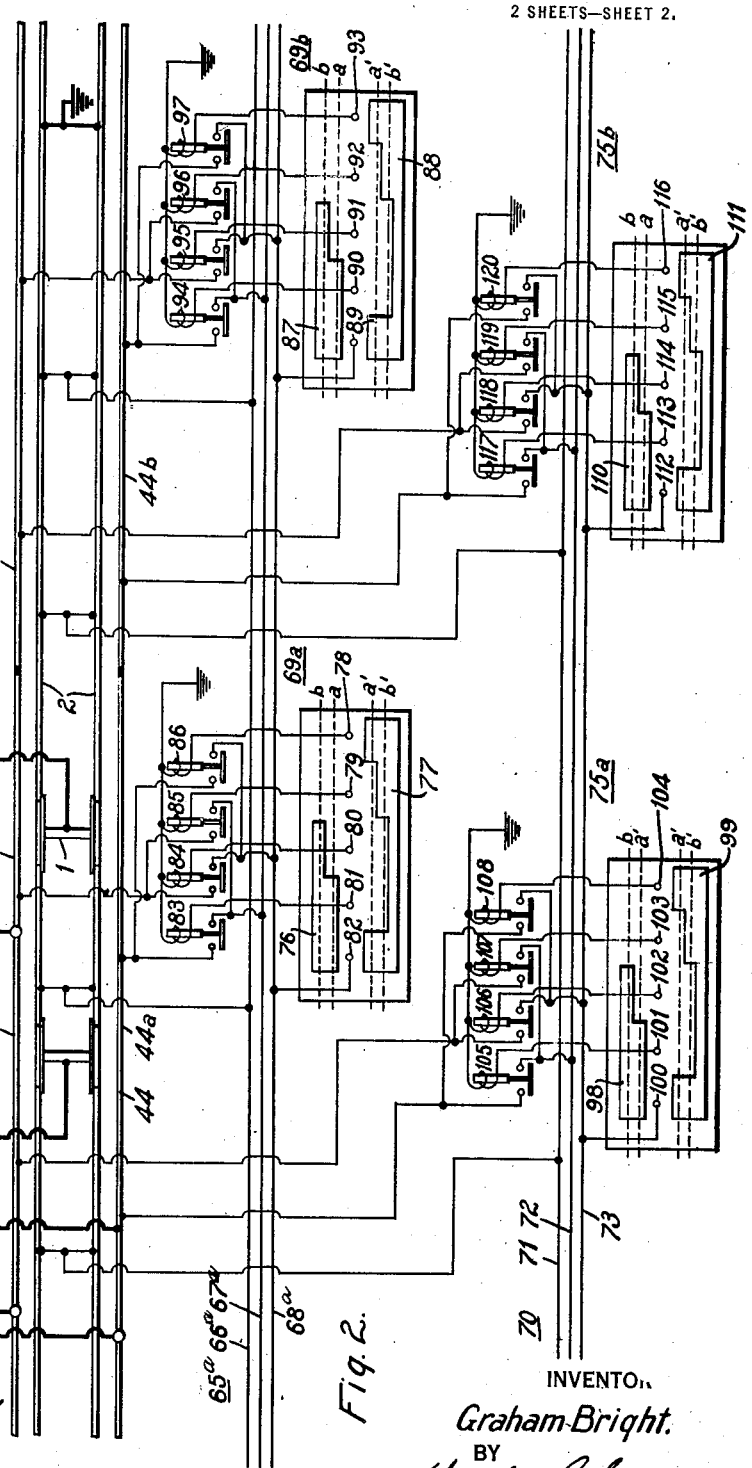

GRAHAM BRIGHT, OF WILKINS TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,355,533.   Specification of Letters Patent.   Patented Oct. 12, 1920.

Application filed March 8, 1917. Serial No. 153,331.

*To all whom it may concern:*

Be it known that I, GRAHAM BRIGHT, a citizen of the United States, and a resident of Wilkins township, in the county of Allegheny and State of Pennsylvania, have invented a new and useful Improvement in Control Systems, of which the following is a specification.

My invention relates to systems of control and particularly to systems of control for electric railway vehicles.

One object of my invention is to provide a system of control having an electric motor contained therein which shall be automatically accelerated in a forward or in a reverse direction by means of a polyphase current and be controlled either from a point on the vehicle or from a remote point.

Another object of my invention is to provide an electric vehicle with a control system having a brake magnet which shall be connected to one conductor of a polyphase supply circuit and be operated by means disposed on the vehicle or by means disposed at a remote point.

More specifically, my invention embodies a control system for an electric vehicle which is provided with one or more induction motors. A controller is mounted on the vehicle for connecting the motor or motors to a supply circuit to effect automatic acceleration of the motor or motors in a forward or in a reverse direction and to energize a brake magnet for effecting the release of the vehicle brakes. A three-phase supply circuit is provided for operating the vehicle, one conductor of said circuit being grounded and the remaining two conductors being connected to insulated sections of two feed-rail conductors. Controllers are provided at remote points for selectively energizing the various feed-rail sections by different phases of the supply current, whereby the vehicle may be operated in a forward and in a reverse direction.

In many industrial concerns, for example, in mining properties, it is very desirable to have all the ore cars automatically controlled from a central point, to effect automatic acceleration of the cars in a forward and in a reverse direction and to manually govern the operation of the cars by means of controllers mounted on them. It may also be desirable to permit a car to coast and effect the so called spotting of cars. Thus, the supply circuit connected to a car may be broken and the car permitted to coast until a predetermined point is reached, when the brakes of the car are applied.

Control systems of the above character, adapted for energization from a direct-current source, have been constructed but considerable difficulty has been encountered in such systems in effecting the operation of the cars in both a forward and a reverse direction from a remote point. Moreover, it is essential to resort to dynamic braking in a direct-current system when a car is descending grades which requires special track switches. According to my invention, a three-phase current is supplied to the cars for effecting automatic acceleration of the same by a controller located on one of them or by controllers located at a distance from the cars. The controllers connect the various phases of a polyphase supply circuit to the cars in a manner to selectively effect automatic acceleration of the cars in a forward or in a reverse direction, the reversing of the movement of the cars being effected by merely interchanging two conductors of the three-phase supply circuit. When the cars are provided with polyphase induction motors, the speed of the same is maintained practically constant at all times. In case the car is operating on a down grade, the speed of the same increases slightly and the motors automatically serve as generators for returning energy to the supply circuit. Thus, the operator, by reason of the uniform speed of the cars, may maintain all the cars properly spaced and increase the output of the system, as compared with a system which operates the cars at variable speeds.

In the accompanying drawings illustrating my invention, Figure 1 is a diagrammatic view of the control circuits which are embodied on one car; Fig. 2 is a diagrammatic view of the circuits for effecting the remote control of the car; Fig. 3 is a control chart illustrating the sequence of operation of the switches illustrated in Fig. 1 when the vehicle is automatically accelerated in a forward direction; and Fig. 4 is a diagrammatic view of a switching device that is employed in connection with my invention.

Referring to Fig. 1 of the drawings, an electric vehicle, having driving wheels 1 operating on a track 2, is provided with induction motors M1 and M2. The induction motor M1 is provided with three primary windings 3, 4 and 5 and secondary windings 6 which are connected in circuit with a plurality of resistors 7, 8, 9, 10, 11 and 12. The induction motor M2 is provided with primary windings 19, 20 and 21 and with secondary windings 22 which are in circuit with the resistors 23 to 28, inclusive. A plurality of switches 13 to 18, inclusive, and switches 29 to 34, inclusive, are respectively provided for excluding the resistors 7 to 12, inclusive, and resistors 23 to 28, inclusive, from the circuit of the secondary windings, 6 and 22. A plurality of switches 35 to 38, inclusive, and switches 39 to 42, inclusive, are provided for selectively connecting the primary windings of the motors M1 and M2 to feed-rail conductors 43 and 44.

A master controller 45, embodying movable contact segments 46 to 49, inclusive, is adapted to be moved through three forward positions and three reverse positions for engaging the contact fingers 50 to 55, inclusive, to govern the operation of the motors M1 and M2. A brake magnet 56 is provided for releasing the brakes $56^a$ of the vehicle, and a unit switch 57 is provided for connecting the controller segments 46 and 49 to the feed-rail conductor 43.

The coils of the switches 38 and 42, the switches 36 and 40, the switches 37 and 41, and the switches 35 and 39 are disposed in pairs for respectively operating the interlock switches 38—out and 38—in, the interlock switches 36—out and 36—in, the interlock switches 37—out and 37—in, and the interlock switches 35—out and 35—in. The switches 13 to 18, inclusive, and the switches 29 to 34, inclusive, which exclude the resistors 7 to 12, inclusive, and the resistors 23 to 28, inclusive, from the secondary circuits of the induction motors M1 and M2, are disposed in pairs for operating the interlock switches 58 to 62, inclusive, and the interlock switches 16—in, 15—in, 17—in, 14—in, 18—in and 13—in. The pairs of switches 16 and 32, 15 and 31, 17 and 33, 14 and 30, 18 and 34, and 13 and 29 respectively govern the operation of the interlock switches 58 and 16—in, 59 and 15—in, 60 and 17—in, 61 and 14—in, 62 and 18—in, and 13—in. Fig. 4 shows the switch structure and interlocks as regards the switches 15 and 31, and this device is typical.

Two limit switches, L1 and L2, respectively, having coils 63 and 65 in circuit with the primary winding 21 of the motor M2 and coils 64 and 66 in circuit with the primary winding 5 of the motor M1, are provided for effecting automatic acceleration of the motors. In case the motors are supplied with a high voltage current, the limit switches are connected to the motor circuits by means of transformers. As the current drawn by the motors M1 and M2 is considerably greater when the car is loaded, it is necessary to provide two limit switches, one of which is effective when the car is loaded and the other of which is effective when the car is empty. In case the car is operating without a load, the switch 67 is opened and the current which is supplied to the motors is governed solely by the limit switch L2, and, when a load is carried by the car, the switch 67 is closed so that the limit switch L1, which is operated by a heavier current than the limit switch L2, will control the current which is supplied to the motors M1 and M2.

A switch $57a$ is provided for insuring the deënergizing of the motor switches when the feed-rails are deënergized to release the brake magnet for applying the brakes $56a$ of the vehicle. The switch $57a$ is inserted in the circuit of the coils of switches 35, 36, 39 and 40 and the coil thereof is connected in circuit with the brake magnet 56 to the feed rail 44. Thus, when the feed rail 44 is disconnected from the supply circuit, the switch $57a$ is released for releasing the motor switches 35, 36, 39 and 40 to insure the deënergization of the motors M1 and M2. In case the circuit of the coils of the switches 35, 36, 39 and 40 was not broken by the switch $57a$, the motors M1 and M2 would serve as generators to supply energy for operating the various motor switches.

In case it is desired to operate the car in a forward direction by means of the controller 45 mounted upon the same when the feed rails are energized, the controller is moved from the "off" position to the position $a$. In the position $a$ of the controller, a circuit is completed from the feed-rail conductor 44, through the coil of switch $57a$, the contact fingers 54 and 55—which are bridged by the contact segment 47—and the brake-release magnet 56 to the rail conductors 2. The brake-release magnet is operated for releasing the brakes to permit the operation of the car. The switch $57a$ is operated for a purpose set forth above, and the unit switch 57 is operated for connecting the contact finger 50 to the feed-rail conductor 43.

When the controller is moved to position $b$, a circuit is completed from the feed-rail conductor 43, through the switch 57, and contact fingers 50 and 52—which are bridged by the contact segment 46—where the circuit divides, one branch extending through the interlock switch 38—out and the coils of the switches 36 and 40 to the rail conductors 2, and the second branch extending through the interlock switch 35—out and the coils of the switches 37 and 41 to the rail conductors 2. The switches 36 and 40 and the switches 37 and 41 are operated to connect the primary coils 4 and 20 of the motors M1 and M2 to the rail conductor 43 and the primary coils 3 and 19 to the rail conductor 44 to thus operate the motors in a forward direction.

In order to automatically accelerate the motors to full speed, the controller 45 is moved to position $c$ where a circuit is completed from the feed-rail conductor 43, through the switch 57, contact fingers 50 and 53—which are bridged by the contact segment 46—interlock switch 36—in, which is operated by the coils of the switches 36 and 40, limit switch L1, switch 67, interlock switch 58, and the coils of the unit switches 16 and 32 to the rail conductors 2. Thus, the switches 16 and 32 are operated to complete circuits through the secondary windings of the induction motors M1 and M2. A holding circuit is provided for the coils of the unit switches 16 and 32 which may be traced from the feed-rail conductor 43 through the switch 57, contact fingers 50 and 52—which are bridged by the contact segment 46—interlock switch 37—in, which is operated by the coils of the switches 37 and 41, interlock switch 58 and the coils of the unit switches 16 and 32 to the rail conductors 2.

When the unit switches 16 and 32 are operated, the interlock switch 16—in is closed to complete a circuit from the feed-rail conductor 43 through the interlock switch 59 and the coils of the switches 15 and 31, which are closed when the current through the motors M1 and M2 has been reduced sufficiently to permit the closing of the limit switch L1. The switches 15 and 31 are operated to short-circuit the resistors 8 and 24 from the circuit of the secondary windings of the motors M1 and M2. A holding circuit is established through the interlock switch 59 for the coils of the unit switches 15 and 31 in a manner similar to that described in setting forth the operation of the switches 16 and 32, and an energizing circuit for the coils of the unit switches 17 and 33 is prepared through the interlock switch 15—in, which is closed when the motor current is reduced sufficiently to release the limit switch L1. In a similar manner, the switches 14 and 30, the switches 18 and 34, and the switches 13 and 29 are automatically operated by means of the limit switch L1 to exclude the various resistors from the secondary circuits of the induction motors M1 and M2.

Assuming the master controller 45 to be in the "off" position and it is desired to operate the car in a reverse direction, the controller is first moved to position $a'$ to complete a circuit through the brake-release magnet 56 and the coil of the switch 57.

When the controller is moved to position $b'$, a circuit is completed from the feed-rail conductor 43, through the switch 57 and contact fingers 50 and 51—which are bridged by the contact segment 49—where the circuit divides, one branch extending through the interlock switch 36—out and the coils of the unit switches 38 and 42 to the rail conductors 2, and the second branch extending through the interlock switch 37—out and the coils of the unit switches 35 and 39 to the rail conductors 2. The switches 35 and 39, and the switches 42 and 38 are operated to connect the primary windings 3 and 19 to the feed-rail conductor 43 and the primary windings 4 and 20 to the feed-rail conductor 44, and thus operate the motors M1 and M2 in a reverse direction. The resistors 7 to 12, inclusive, and the resistors 23 to 28, inclusive, are short-circuited by means of the switches 13 to 18, inclusive, and the switches 29 to 34, inclusive, to accelerate the motors, in a manner similar to that described in setting forth the forward operation of the car.

In case the car be operated without a load, the switch 67 is opened in order to control the operation of the switches 13 to 18, inclusive, and the switches 29 to 34, inclusive, by means of the limit switch L2.

In order to operate the car from a remote point, the feed-rail conductors 43 and 44 are divided into insulated sections, two only of which, 43$a$ and 43$b$, and 44$a$ and 44$b$, are illustrated in Fig. 2 of the drawings. A three-phase supply circuit 65$a$, comprising conductors 66$a$, 67$a$ and 68$a$, is adapted to be selectively connected to the rail conductors 2, 44 and 43 by means of the tower master controller 69$a$ and 69$b$. A three-phase supply circuit 70 of a different voltage and frequency from the three-phase supply circuit 65$a$, and comprising conductors 71, 72 and 73, is adapted to be selectively connected to the rail conductors 2, 44 and 43 by means of the tower master controllers 75$a$ and 75$b$. The controllers 69$a$ and 69$b$ may be interlocked with the controllers 75$a$ and 75$b$ in any customary and approved manner, in order to prevent the two supply circuits from being connected simultaneously to the rail conductors. By varying the voltage and the frequency of the polyphase supply circuits, which are connected to the feed rails, the cars may be operated at two or more definite speeds on various sections of the track.

The master controller 69$a$ embodies two movable contact segments 76 and 77 which are adapted to engage the contact fingers 78 to 82, inclusive, when moved in a forward or in a reverse direction and to selectively energize the coils of the switches 83, 84, 85 and 86 to connect the conductors 67$a$ and 68$a$ to the feed-rail sections 43$a$ and 44$a$. The master controller 69$b$ embodies two movable contact segments 87 and 88 which are moved in a forward or in a reverse direction for engaging contact fingers 89 to 93, inclusive, to complete a circuit through the coils of the switches 94 to 97, inclusive, and to selectively connect conductors 67a and 68a to the feed-rail sections 43b and 44b.

The master controller 75a embodies two movable contact segments 98 and 99 which are moved in a forward or in a reverse direction to engage the contact fingers 100 to 104, inclusive, and to complete circuits through the coils of the switches 105 to 108, inclusive. Thus, the conductors 72 and 73 of three-phase circuit 70 are selectively connected to the feed-rail sections 43a and 44a.

The master controller 75b embodies movable contact segments 110 and 111 which are moved in a forward and in a reverse direction to engage contact fingers 112 to 116, inclusive and to selectively complete circuits from the coils of the switches 117 to 120, inclusive. The switches 117 to 120, inclusive, selectively connect the conductors 72 and 73 of the three-phase circuit 70 to the feed-rail sections 43b and 44b.

Before the motors M1 and M2 can be operated by means of the tower controllers 69a, 69b, 75a and 75b, the master controller 45, which is illustrated in Fig. 1 of the drawings, is to be operated to position c or position c', so as to connect the primary windings of the motors M1 and M2 to the rail conductors. Considering the master controller 45 to be in position c and the car to be adjacent to the feed-rail sections 43a and 44a, the motors M1 and M2 may be connected to the supply circuit 65a and operated in a forward direction by moving the tower controller 69a through positions a and b. When the controller 69a is moved to position a, the switch 83 is operated to connect the feed-rail section 44a to the supply conductor 67a and thus energize the brake-release magnet 56. When the controller is moved to position b, the switch 84 is operated to connect the feed-rail section 43a to the supply conductor 68a. Thus, the supply conductors 67a and 68a are respectively connected to the feed-rail sections 44a and 43a and the motors M1 and M2 are operated in a forward direction.

In case it is desired to connect the motors M1 and M2 to the supply circuit 65a to operate the car in a reverse direction, the master controller 69a is moved through positions a' and b'. In position a' of the master controller 69a, the switch 86 is operated to connect the supply conductor 68a to the feed-rail section 44a and thus operate the brake-release magnet, and, in position b' of the master controller, the switch 85 is operated to connect the supply conductor 67a to the feed-rail section 43a. The reversing of the motors M1 and M2, when the master controller is moved to position b', is accomplished by reversing the former connections of the supply conductors 67a and 68a to the feed-rail sections 43a and 44a.

When the car is in motion and it is desired to deënergize the motors to permit the car to coast, the controller 69a, 69b, 75a or 75b, which has been operated, is returned to position a or to position a' according to the direction of movement of the car. Thus, the feed-rail 43 is deënergized and the motor switches which connect the motor to the feed rails are released to disconnect the motors from the feed rails. When the tower controller is moved to the "off" position, the feed rail 44 is disconnected from the supply circuit to deënergize the brake magnet 56 and apply the brakes of the car.

In case it is desired to operate the motors in a forward direction from the supply circuit 70, the master controller 75a is moved through positions a and b for connecting the supply conductors 72 and 73 to the feed-rail sections 44a and 43a, and, in case it is desired to reverse the direction of rotation of the motors M1 and M2, the master controller is moved through positions a' and b' for connecting the supply conductors 72 and 73 to the feed-rail sections 44a and 43a in a reverse order to that provided by the former connection.

When the vehicle is moved from adjacent to the feed-rail conductors 43a and 44a into connection with the feed-rail conductors 43b and 44b, the movement of the vehicle is then under the control of the master controllers 69b and 75b. In case it is desired to connect the motors M1 and M2 to the supply circuits 65a and to operate the vehicle in a forward or in a reverse direction, the controller 69b is respectively moved to position b or to position b'. In case it is desired to connect the motors to the supply circuit 70 to operate the same in a forward or in a reverse direction, the master controller 75b is respectively moved to position b or to position b'.

The switches 83 to 86, inclusive, the switches 105 to 108, inclusive, the switches 94 to 97, inclusive, and the switches 117 to 120, inclusive, which are respectively associated with the master controllers 69a, 75a, 69b and 75b, are respectively disposed adjacent to the feed-rail sections with which they are associated, whereas the master controllers 69a, 69b, 75a and 75b are disposed at any convenient points for operating the same.

In case the vehicle is operated by the master controller 45, the various feed-rail sections must be energized from one of the supply circuits 65a and 70 by means of the controllers which are provided for controlling the vehicle from a remote point and, on the other hand, if it is desired to control the vehicle by the controllers disposed at a remote point, it is necessary to operate the controller 45 to position $c$ or position $c'$ so as to connect the motors M1 and M2 to the feed-rail conductors.

Modifications in the system and arrangement and location of parts may be made within the spirit and scope of my invention, and such modifications are intended to be covered by the appended claims.

I claim as my invention:

1. In a system of control, the combination with a supply circuit energized by a three-phase current, an electric vehicle connected to said supply circuit, and a brake magnet for said vehicle, of means for governing the connections of the various phases of said three-phase current to the vehicle to operate the vehicle in a forward and in a reverse direction and to control the brake magnet.

2. In a system of control, the combination with a polyphase-current supply circuit, an electric vehicle connected to said supply circuit, a propelling motor for said vehicle and a brake magnet for said vehicle, of means for governing said polyphase current from a remote point to selectively control the operation of said motor and that of the brake magnet.

3. In a system of control, the combination with a polyphase-current supply circuit, an electric vehicle having induction motors connected to said supply circuit, and means for effecting step-by-step automatic acceleration of said motors in a forward and in a reverse direction, of means disposed at a remote point for governing the operation of said accelerating means.

4. In a system of control, the combination with an alternating-current supply circuit and an electric vehicle having induction motors connected to said supply circuit, of means for effecting step-by-step automatic acceleration of said motors in a forward and in a reverse direction, said means being controlled from a remote point.

5. In a system of control, the combination with a supply circuit, an electric vehicle having propelling motors connected to the supply circuit, and a brake magnet for the vehicle, of means controlled from a remote point for effecting automatic acceleration of the vehicle either in a forward or in a reverse direction at will and for controlling the operation of the brake magnet.

6. In a system of control, the combination with an electric vehicle having rail conductors, two current-feed rails disposed adjacent to said rail conductors, a three-phase-current supply circuit connected to said feed rails and to said rail conductors for supplying energy to the vehicle, and a brake magnet associated with the vehicle and connected to one of said feed rails, of means disposed at a remote point for governing the operation of the vehicle in a forward and in a reverse direction and for governing the operation of the brake magnet.

7. In a system of control, the combination with an alternating-current supply circuit, an electric vehicle having propelling motors connected to the supply circuit, and means for automatically effecting the step-by-step acceleration of said motors, of means disposed at a remote point for controlling said alternating current to govern such acceleration of said vehicle in a forward and in a reverse direction.

8. In a system of control, the combination with an alternating-current supply circuit, an electric vehicle having propelling motors connected to the supply circuit, means for effecting automatic acceleration of said motors in a forward and in a reverse direction, and a brake magnet associated with said vehicle, of means disposed at a point remote from said vehicle for controlling said alternating current to govern the operation of said vehicle in a forward and in a reverse direction and to govern the operation of said brake magnet.

9. In a system of control, the combination with an electric vehicle and a polyphase current for supplying energy to said vehicle, of means disposed on said vehicle for governing the direction of movement of said vehicle, and means disposed at a remote point for performing a similar function to that of said first-named means.

10. In a system of control, the combination with an electric vehicle, an alternating-current supply circuit for said vehicle, and means disposed on said vehicle for effecting automatic acceleration of the same, of controller means disposed on the vehicle for governing said accelerating means to operate the vehicle in a forward and in a reverse direction, and means disposed at a remote point for performing a function similar to that of said controller means.

11. In a system of control, the combination with an alternating-current supply circuit, an electric vehicle having propelling motors connected to the supply circuit, brakes for decelerating the same, and a brake magnet for controlling the operation of said brakes, of means controlled from a remote point for effecting automatic acceleration of the vehicle in a forward and in a reverse direction, for controlling the operation of the brake magnet, and for permitting the vehicle to coast, under predetermined conditions.

12. In a system of control, the combination with a polyphase-current supply circuit, an electric vehicle connected to said supply circuit and provided with brakes, and a brake magnet for said vehicle, of means for varying the characteristic of said polyphase circuit from a remote point to control the operation of the vehicle and for deënergizing the brake magnet to set the vehicle brakes.

13. In a system of control, the combination with an alternating-current supply circuit, and an electric vehicle having motors adapted to be connected to said supply circuit and provided with separate braking means, of means controlled from a remote point for effecting step-by-step automatic acceleration of the vehicle in a forward and in a reverse direction and for rendering said braking means effective.

14. In a system of control, a plurality of supply circuits of different characteristics, an electric vehicle operated by energy received therefrom, a brake magnet associated with the vehicle and means remote from the vehicle for varying the employed supply circuit to also determine the direction of movement of the vehicle and to operate said brake magnet.

In testimony whereof, I have hereunto subscribed my name this 27th day of Feb., 1917.

GRAHAM BRIGHT.